(12) United States Patent
Neustein et al.

(10) Patent No.: US 10,008,039 B1
(45) Date of Patent: Jun. 26, 2018

(54) AUGMENTED REALITY FITTING APPROACH

(71) Applicant: A9.com, Inc., Palo Alto, CA (US)

(72) Inventors: Adam Moshe Neustein, San Francisco, CA (US); William Brendel, San Francisco, CA (US); Kaolin Imago Fire, Berkeley, CA (US); Mark Jay Nitzberg, Berkeley, CA (US); Sunil Ramesh, San Jose, CA (US); Mark Scott Waldo, El Cerrito, CA (US)

(73) Assignee: A9.COM, INC., Palo Alto, CA (US)

( * ) Notice: Subject to any disclaimer, the term of this patent is extended or adjusted under 35 U.S.C. 154(b) by 183 days.

(21) Appl. No.: 14/957,158

(22) Filed: Dec. 2, 2015

(51) Int. Cl.
| | | |
|---|---|---|
| *G06T 11/00* | (2006.01) | |
| *G06T 11/60* | (2006.01) | |
| *G09G 5/14* | (2006.01) | |
| *G06Q 30/06* | (2012.01) | |
| *G06T 19/00* | (2011.01) | |
| *G06F 3/01* | (2006.01) | |
| *A41H 1/02* | (2006.01) | |

(52) U.S. Cl.
CPC ............ *G06T 19/006* (2013.01); *A41H 1/02* (2013.01); *G06F 3/011* (2013.01); *G06Q 30/0601* (2013.01); *G06Q 30/0621* (2013.01); *G06Q 30/0641* (2013.01); *G06Q 30/0643* (2013.01); *G06T 11/001* (2013.01); *G06T 11/60* (2013.01); *G09G 5/14* (2013.01)

(58) Field of Classification Search
CPC .......... G06Q 30/0601–30/0643; G06T 11/001; G06T 11/60; G09G 5/14
USPC ................ 345/581, 619, 629; 705/26.1–27.2
See application file for complete search history.

(56) References Cited

U.S. PATENT DOCUMENTS

| | | | | |
|---|---|---|---|---|
| 2001/0026272 | A1* | 10/2001 | Feld ........................ | A41H 3/007 345/419 |
| 2014/0118396 | A1* | 5/2014 | Sugita ..................... | G06T 11/00 345/630 |

* cited by examiner

*Primary Examiner* — Kee M Tung
*Assistant Examiner* — Andrew Shin
(74) *Attorney, Agent, or Firm* — Hogan Lovells US LLP

(57) ABSTRACT

Various approaches discussed herein enable providing a virtual reality experience of trying on clothes by augmenting an image of an article of clothing so that it appears to be worn by a particular person who is represented in a separate image. The image of the person wearing a special article of clothing containing a number of gridlines is analyzed along with an image of the special article of clothing as it appears unworn. The analysis includes calculating differences in the images to determine a change in the position of the gridlines between the images, then used to generate body shape data. The body shape data is used to augment an image of a prospective article of clothing, which modified image is then combined with the image of the person wearing a special article of clothing and displayed.

18 Claims, 10 Drawing Sheets

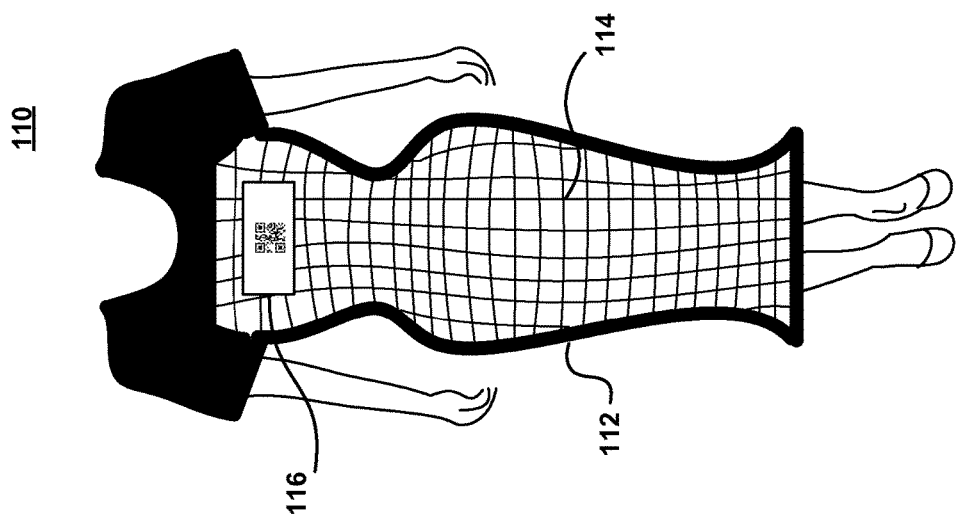
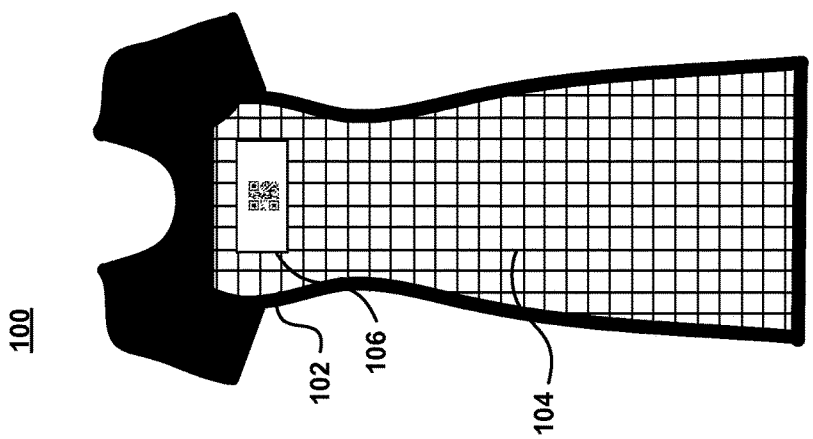
FIG. 1B
FIG. 1A

AUGMENTED REALITY FITTING APPROACH

BACKGROUND

In an effort to eliminate the need to physically "try on" clothes, various approaches have been developed that use photographic imagery of clothing, augmented by the ability to virtually alter the clothing with various options such as changing viewing angles, lighting, and even the color and pattern of the virtual clothes in an attempt to create a virtual reality fitting session. These augmented reality approaches are designed to replicate as much of the "in-person" feel and advantage as possible. While these approaches are an effective way to convey some information about a product, they still suffer when compared to the ability to try on clothes to gauge their fit, for example.

BRIEF DESCRIPTION OF THE DRAWINGS

Various embodiments in accordance with the present disclosure will be described with reference to the drawings, in which:

FIGS. 1A-1B illustrate example articles of clothing utilized in an augmented reality fitting approach, in accordance with various embodiments;

DETAILED DESCRIPTION

Figure 2:
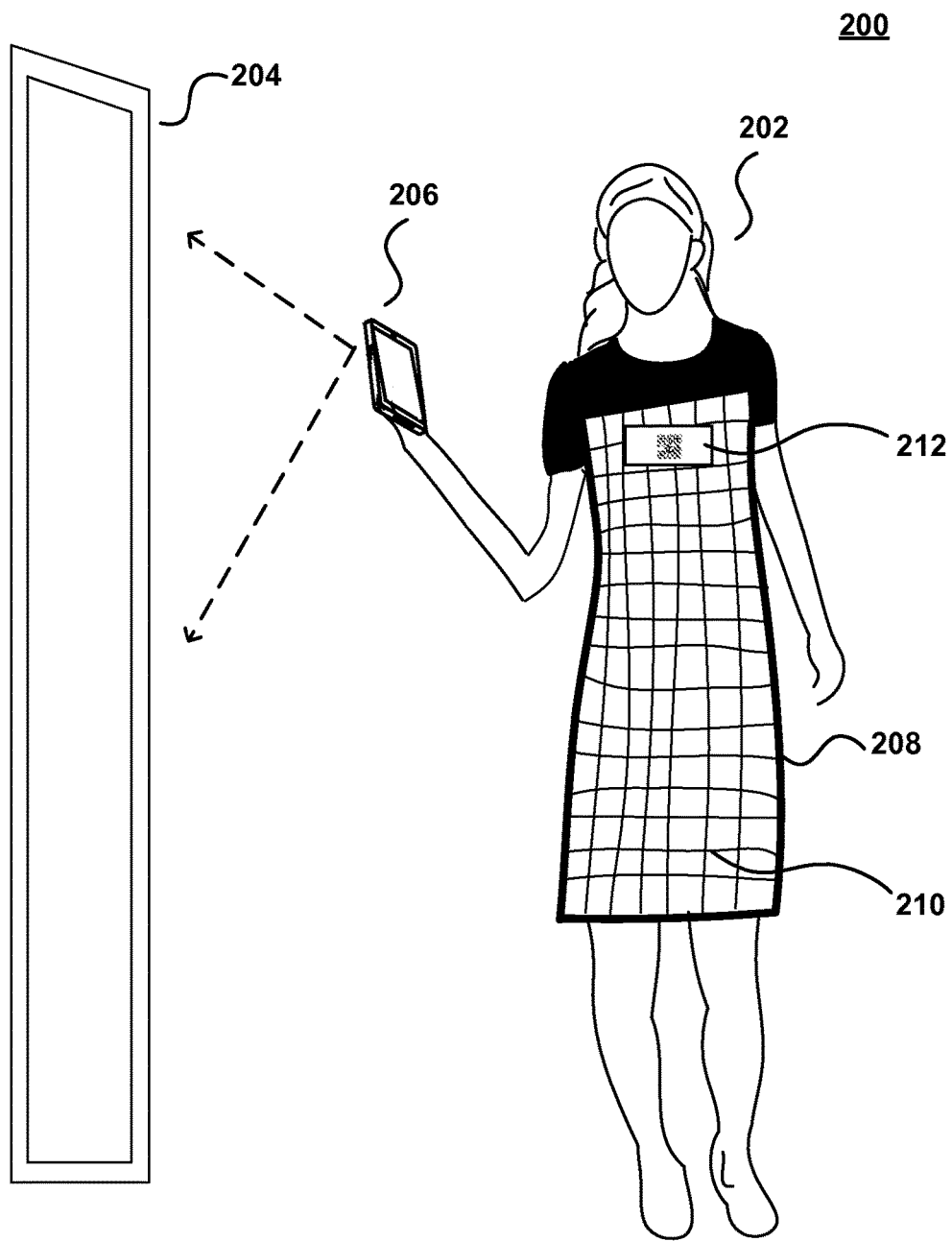
FIG. 2 illustrates an example image capture setup for capturing images of an article of clothing utilized in an augmented reality fitting approach, in accordance with various embodiments.

Systems and methods in accordance with various embodiments of the present disclosure may overcome one or more of the aforementioned and other deficiencies experienced in conventional approaches for providing views of articles of clothing that offer an accurate depiction of how the article of clothing would look like on a person. In particular, various embodiments enable modifying an image of a prospective article of clothing based on data corresponding to a person's body shape and displaying the modified image on an image of the person in an augmented reality fitting room. Various conventional approaches can attempt to superimpose an article of clothing onto a representation of a person's body, but such approaches can be computationally expensive and not highly accurate.

Various approaches discussed herein enable augmented reality fitting by receiving an image of a "special article of clothing" being worn by a person, the special article of clothing having various markings that enable a determination of the person's body shape, which in various embodiments may be represented by, for example, "body data" such as a mathematical matrix representation of how the markings on the special article of clothing change when the special article of clothing is worn by the person. Based on this body data, an image of a prospective article of clothing (e.g., selected by the person on a shopping website) may be modified based on the body data so that it appears as it would if worn by the person. This modified image is then combined with the image of the person wearing the special article of clothing (e.g., layered, etc.) and displayed so that the prospective article of clothing appears as if worn by the person.

Various other applications, processes, and uses are presented below with respect to the various embodiments, each of which improves the operation and performance of the computing device(s) on which they are implemented.

FIGS. 1A and 1B illustrate example articles of clothing utilized in an augmented reality fitting approach, in accordance with various embodiments. In the example of FIG. 1A, a dress 100 is illustrated in an "unworn state," that is, not being worn by a person. It should be noted that, although dresses are used as an example, various other articles of clothing may be used, and can benefit from aspects of the various embodiments as should be apparent in light of the teachings and suggestions contained herein. Hereinafter, the article of clothing used to determine body shape data through analysis of an image of a person wearing the article of clothing may be referred to as a "special article of clothing."

The dress (i.e., the special article of clothing) 100 of FIG. 1A has several markings. A contour marking 102 appears on the dress, for example to define a shape or periphery of the dress. As described herein, there may be multiple contour markings defining an outline of the dress as viewed from various angles, and contour marking 102 may take up more or less of the dress as illustrated in the examples of FIGS. 1A-1B. The dress 100 also has a fitting grid 104 printed or otherwise caused to be visible on one or both sides (e.g., front and/or back) of the dress. The fitting grid may comprise one or more intersecting vertical and horizontal lines, although various embodiments are not so limited. In the unworn dress 100 of FIG. 1A, the grid appears uniform and substantially symmetrical, although various embodiments may be implemented wherein the grid is uneven. The dress 100 also has a reference marker 106 displayed on the front of the dress 100, although the location and number of the reference marker 106 may vary according to the embodiment. While the reference marker 106 of FIG. 1A is represented as a QR code, other examples of reference markers 106 may be used; for example, fiducials, text, etc. Any type of marking may be used, for example one that may be recognized and/or translated into data by a computer. The reference marker 106 may be used in various embodiments to access data about the special article of clothing; for example, dimension data (e.g., size, inseam, neck circumference, etc.) about the special article of clothing and data describing the type of special article of clothing (e.g., shirt, dress, leggings, etc.). According to various embodiments, reference marker 106 may provide data about the particular device and/or user to which the device is linked, for example to reference a particular user account. Reference marker 106 may also redirect a user to a particular point in the augmentation process; for example, upon identifying reference marker 106 in the photograph taken by a user, the user may be redirected to another step in the augmentation process such as uploading the image, linking the image (and/or the data associated with the image) to a user account, etc.

The dress 110 of FIG. 1B is in a "worn state," meaning the dress is being worn by a person. While the reference marker 116 of the dress 110 of FIG. 1B is similar, it is clear that the contour marking 112 and the fitting grid 114 of the dress 110 of FIG. 1B are different from the dress 100 of FIG. 1A. Because the dress 110 of FIG. 1B is being worn, the shape of the dress is changed due to the body shape of the person wearing it. The fabric of the dress 110 of FIG. 1B shifts, stretches, sags, and skews in various locations due to the person's body shape. This change in shape may be represented by the fitting grid 114 as compared to the fitting grid 104 of the dress 100 of FIG. 1A in the unworn state. As discussed further herein, changes in the markings such as the contour marking 102, 112 and the fitting grid 104, 114 as represented in an image of a special article of clothing may be used to augment an image of a "prospective article of clothing" so that it appears as if it were being worn by the person wearing the special article of clothing.

While the fitting grid 114 in the examples of FIGS. 1A-1B is not illustrated as extending into or otherwise integrating with the black contour marking 102 or into the reference marker 116, various embodiments are envisioned in which both features are so integrated. For example, fitting grid 114 may cover a portion of, or the entire special article of clothing, such that it is represented in the contour marking 102 with a different color (e.g., white on black, etc.) or some other type of representation known in the art, and may be integrated into reference marker in a similar or different fashion. While the examples of FIGS. 1A-1B are illustrated in black and white, any color, shade, tint, or pattern may be used, such that can be discerned either visually or computationally; additionally, various types of markings may be utilized for the contour marking 102, such as those having varying thicknesses or alternating placements, as well as being a continuous marking around a periphery or outline of the special article of clothing or only partially present. For example, the contour marking 102 could be a dashed marking, or be present at certain places around the special article of clothing, for example at particular points (e.g., dots at the bottom corners, sleeve bottoms, mid-neckline, etc.) which could be sufficient to ascertain the outline or shape of the special article of clothing.

In addition to potentially acting as a data source as described herein, reference marker 116 may be used as an "anchor" or reference point, which when combined with the contour marking 102, provides a more accurate approach to analyzing the fitting grid 114. For example, a process of analyzing the fitting grid 114 may begin by locating/recognizing a placement of reference marker 116, and then proceeding to ingesting/recognizing/analyzing the fitting grid 114 until reaching the contour marking 102, thereby giving an indication that the fitting grid has been completely and accurately ingested into the analyzing process.

FIG. 2 illustrates an example image capture setup 200 for capturing images of an article of clothing utilized in an augmented reality fitting approach, in accordance with various embodiments. In the example of FIG. 2, a person is wearing an example of a special article of clothing 202 (here, a dress), having a reference marker 212, a contour marking 208, and a fitting grid 210, as described with regard to FIGS. 1A-1B and herein. The person wears the special article of clothing (i.e., it is in a "worn state") and takes a picture of herself wearing the special article of clothing in a mirror 204, for example using a cellphone 206. While in the example depicted in FIG. 2, the person is standing at an oblique angle to the mirror 204, it should be understood that best results may be obtained if the image of the special article of clothing 202 captures the entirety of the reference marker 212, contour marking 208, and fitting grid 210, for example in a head-on "selfie" image taken in the mirror. While a "selfie" picture is envisioned in the example of FIG. 2, a picture of the person wearing the special article of clothing, taken by another person, for example, may be utilized. In various embodiments, video may be taken, and the real-time video or one or more images from the video used in various implementations.

Figure 3:
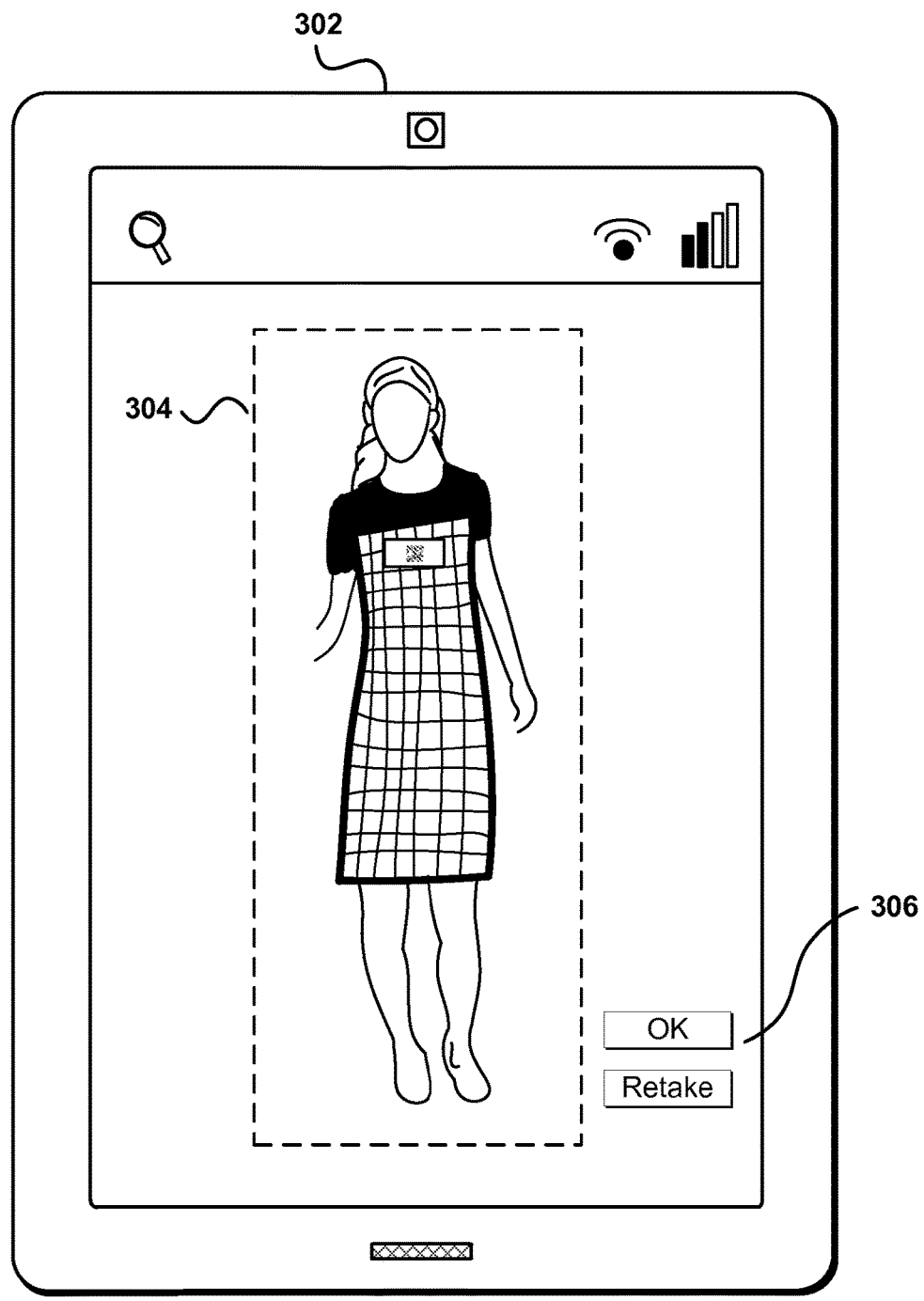
FIG. 3 illustrates an example interface for presenting an image capture, in accordance with various embodiments.

FIG. 3 illustrates an example interface 300 for presenting an image capture, in accordance with various embodiments. In the example 300 of FIG. 3, a portable computing device 302 such as a cellphone or tablet is illustrated, for example the cellphone 206 of FIG. 2. An image of the "selfie" taken in the example of FIG. 2 is displayed 304 on the portable computing device display, along with a user interface control 306 for accepting the image or retaking the image. Other interface elements may be utilized in various embodiments, such as image manipulation and/or modification controls (e.g., contrast, brightness, cropping, etc.), privacy controls, a capability to cause an "upload" of the image 304, for example to a resource provider environment such as that illustrated in FIG. 6, a capability to link the image 304 to a user account associated with the resource provider environment, an website, etc.

Figure 4:
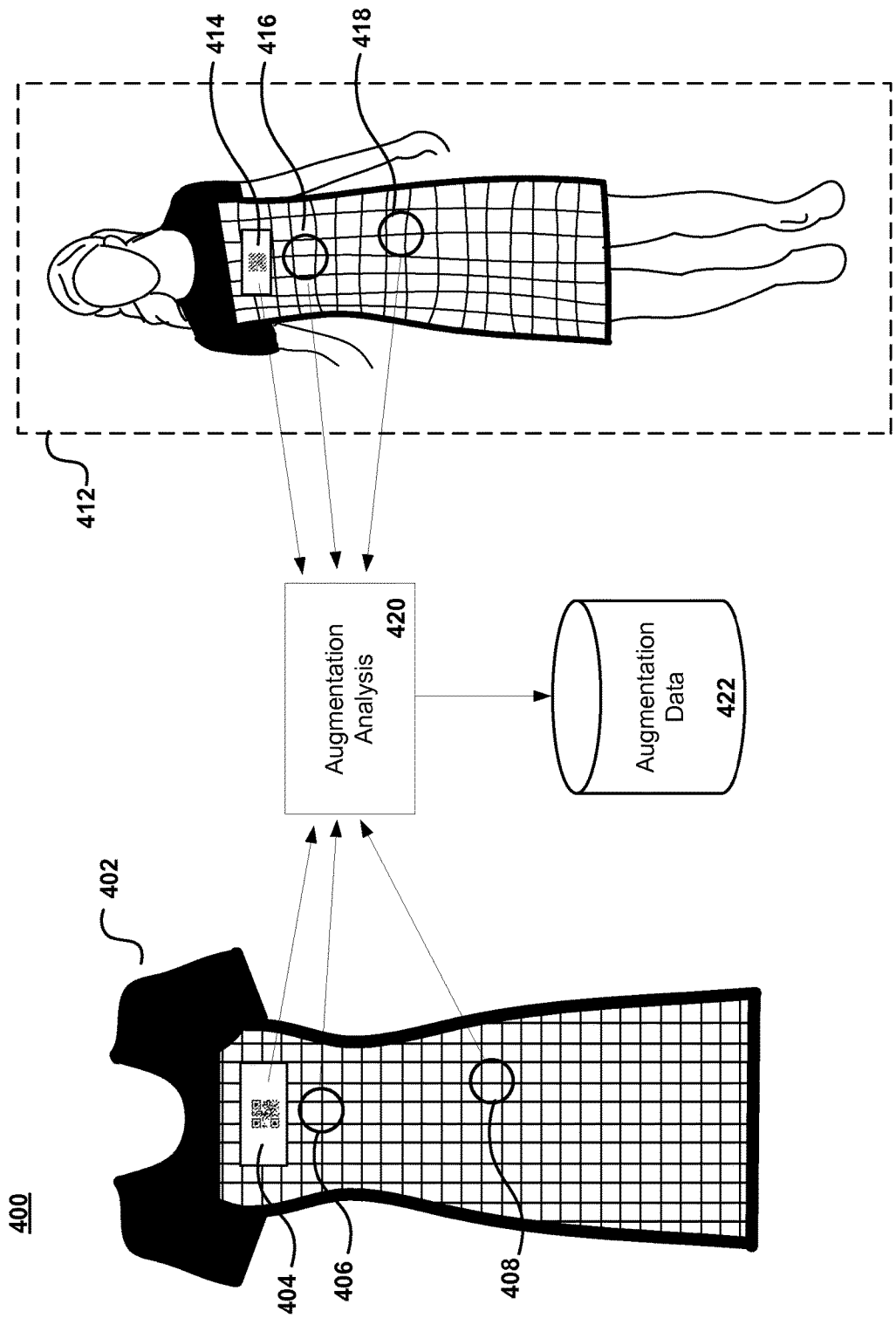
FIG. 4 illustrates an example augmented reality fitting approach, in accordance with various embodiments.

FIG. 4 illustrates an example augmented reality fitting approach 400, in accordance with various embodiments. An image of a special article of clothing 402 is provided (retrieved, etc.), where the image 402 reflects the special article of clothing in an unworn state. A reference marker 404 represented in the image 402 is analyzed, and data corresponding to the special article of clothing is retrieved, as described earlier. A relative position of the vertical and horizontal gridlines comprising the fitting grid of the special article of clothing are analyzed at various locations 406, 408 on the special article of clothing. An image of an identical or substantially similar special article of clothing 412 is received, the special article of clothing being in a worn state. The reference marker 414 on the special article of clothing in the received image is analyzed and data retrieved as described above. Locations on the worn special article of clothing 416, 418 corresponding to the locations on the unworn special article of clothing 406, 408 are identified, and the relative position of the vertical and horizontal gridlines comprising the fitting grid of the worn special article of clothing at the corresponding locations are provided for augmentation analysis 420 along with the data described above with regard to the worn special article of clothing.

The augmentation analysis 420 in an embodiment comprises determining a difference (e.g., movement, etc.) of any of the horizontal or vertical gridlines in the image of the worn special article of clothing at the corresponding locations in the image of the unworn special article of clothing. Augmentation data 422 is created as a result of the augmentation analysis. According to various embodiments, the augmentation data 422 comprises body shape data (e.g., a mathematical representation of a body shape of the person wearing the special article of clothing), in terms of size, dimensions, and stretching of the special article of clothing. The augmentation data 422, such as body shape data, is then utilized as discussed further herein to augment images of prospective articles of clothing.

Figure 5A:
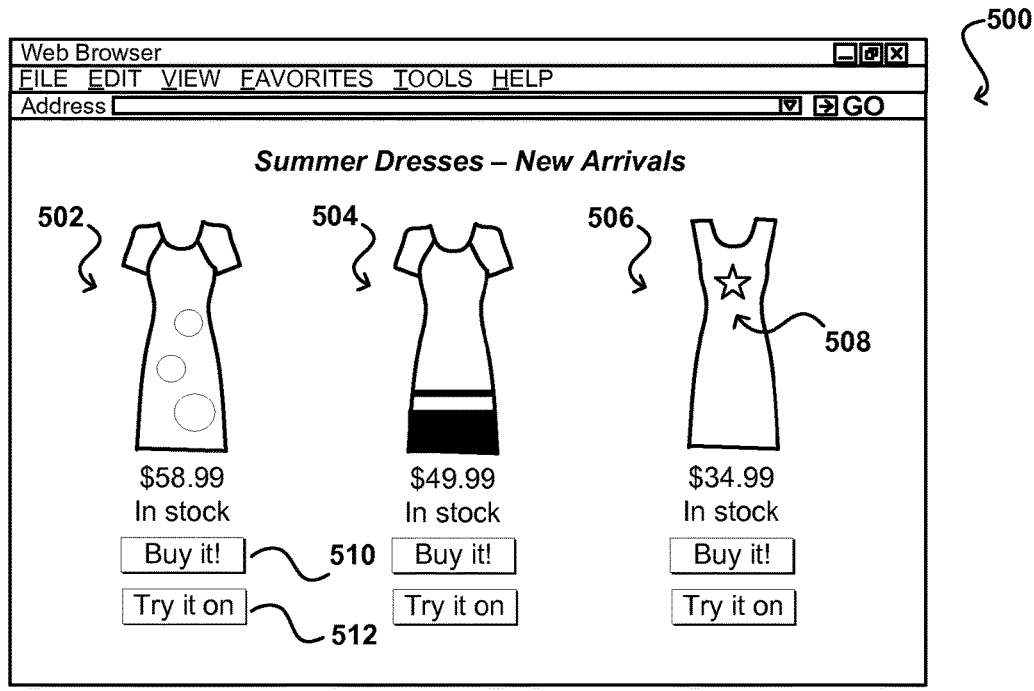
FIGS. 5A-5B illustrate example interfaces with which a user can interact, in accordance with various embodiments.
Figure 5B:
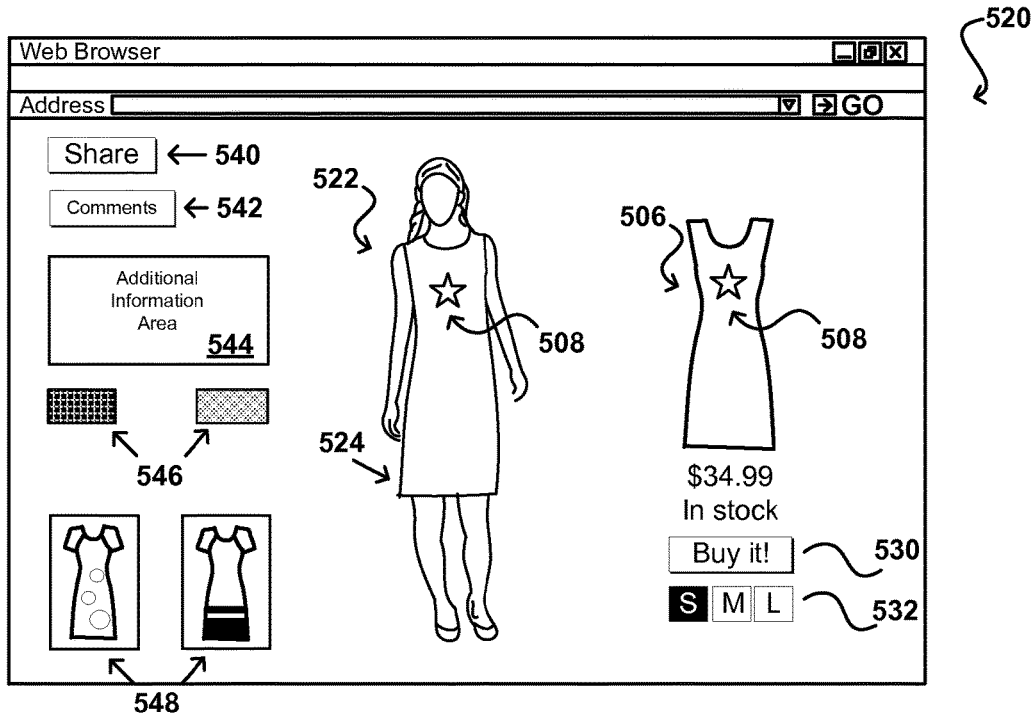

FIGS. 5A-5B illustrate example interfaces with which a user can interact, in accordance with various embodiments. In the example of FIG. 5A, an example website 500 presents various dresses 502, 504, 506 available for purchase (i.e., "prospective articles of clothing"). While a "desktop" web browser interface is presented with regard to FIGS. 5A-5B, it is understood that various types of viewing interfaces of various types of computing device may be utilized, from smartphones, tablets, set-top boxes, laptops, and desktops. Each of the prospective articles of clothing 502, 504, 506 illustrated in FIG. 5A may be accompanied by interface elements operable to receive input. For example, a user may click the "Buy It!" interface element 510 for the first prospective article of clothing 502 to place the order in a "shopping cart" for later purchase, or to instantly purchase, depending on the implementation. An interface element such as the "Try It On" button 512 may be utilized by a user to, for example, initiate an augmented reality fitting session as contemplated by the approaches described herein, or may operate to place the prospective article of clothing in a "fitting queue," the contents of which may be viewed in an augmented reality fitting session later, for example in order by swiping left to right on a touchscreen of a mobile device.

In the example 520 of FIG. 5B, one of the prospective articles of clothing 506 has been selected to be "tried on" in an augmented reality fitting room, in accordance with the techniques described herein. An image 506 of the selected prospective article of clothing is displayed, along with interface elements 530, 532 allowing a selection of a purchase option and a size option. The image 522 of the person wearing the special article of clothing is displayed, and the image 508 of the prospective article of clothing is augmented and displayed with the image 522 of the person wearing the special article of clothing so that the image appears as if the person is wearing the prospective article of clothing.

Various interface elements allow for changing the image 522 to reflect other prospective articles of clothing 548, changing a pattern, color, etc. 546 associated with the prospective article of clothing, sharing 540 the augmented image 522, for example on a social media network, reading comments 542 on the prospective article of clothing, and presenting additional information 544 about the prospective article of clothing, such as sizing and fit information and recommendations as described further herein.

Figure 6:
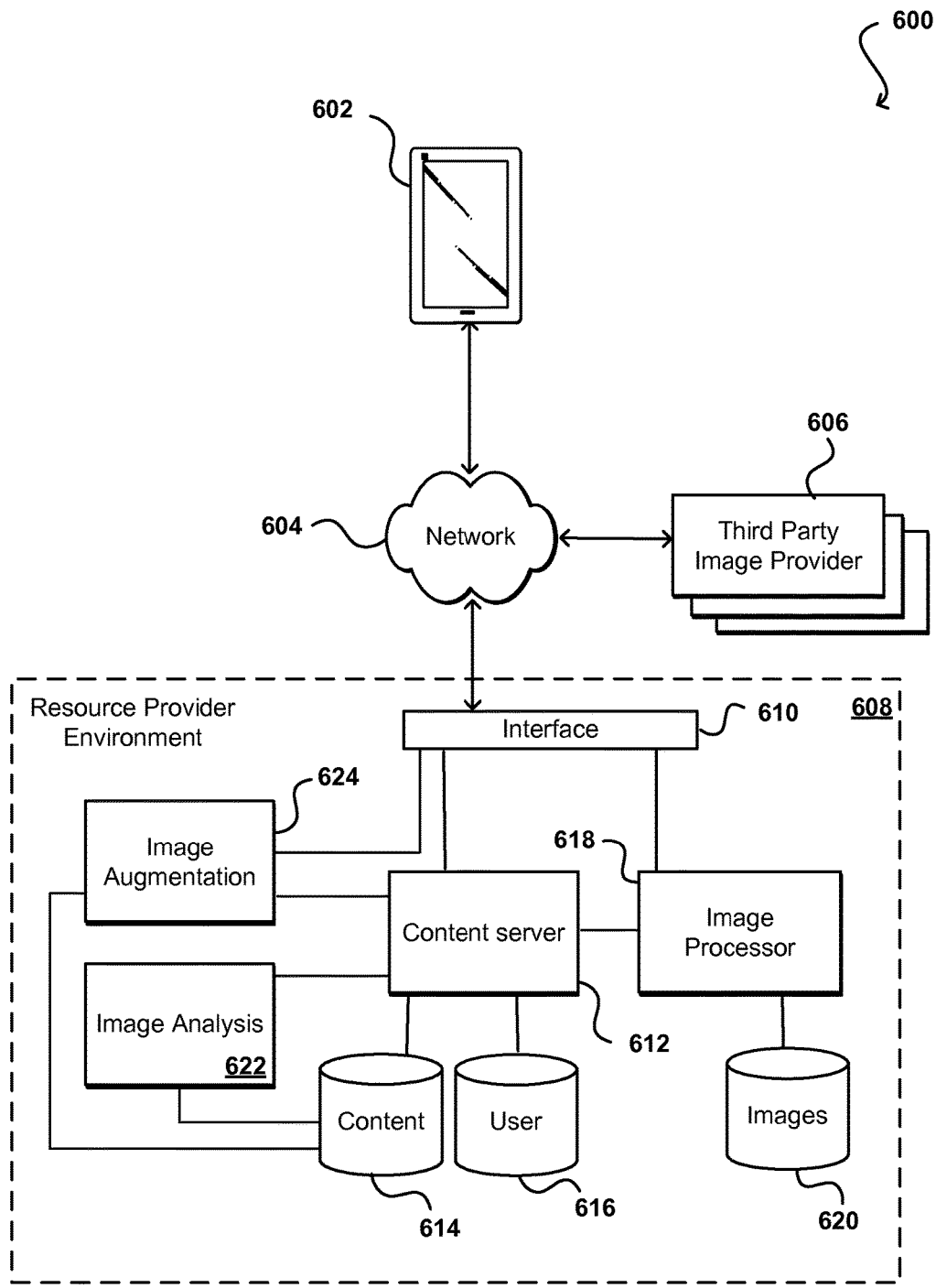
FIG. 6 illustrates an example system that can be used to manipulate images, in accordance with various embodiments.

FIG. 6 illustrates an example environment 600 that can be used to implement aspects in accordance with various embodiments. In FIG. 6, a client computing device 602 can submit a request for content across at least one network 604 to be received by a resource/content provider environment 608. According to various embodiments, a client computing device 602 may comprise a laptop or desktop computer, a set-top device, etc., as well as various types of mobile devices, such as cellphones, tablets, virtual reality headsets, and wearable devices (e.g., glasses, contact lenses, etc.). The network(s) can include any appropriate network, such as the Internet, a local area network (LAN), a cellular network, an Ethernet, or other such wired and/or wireless network. The resource provider environment 608 can include any appropriate resources for providing content from a resource provider, as may include various servers, data stores, and other such components known or used for providing content from across a network (or from the "cloud").

In this example, a call received to the resource provider environment 608 can be received by an interface layer 610 of the environment. As known for network environments, the interface layer can include components such as interfaces (e.g., APIs), load balancers, request and/or data routers, and the like. If the request is a request for content, such as for content for a page to be displayed in an application (e.g., browser), information for the request can be directed to one or more content servers 612, which can obtain the content from a content data store 614 or other such repository to be sent back across the network(s) to the computing device. In some embodiments, information for the request might also be compared against user data in a user data store 616 or other such location do determine, for example, whether the user has access rights to that content. In one example, the content can include a plurality of images to be displayed as part of a set of search results, although various other types of content and uses for images can be utilized as well within the scope of the various embodiments.

In some cases, a request received to the content provider environment 608 might be from another entity, such as a third party image provider 606. As discussed previously, such providers may provide images to be displayed to users along with the served content. The interface layer can determine the type of request and cause information to be forwarded to an image processor 618 or other such component, which in some embodiments can cause the images to be stored to an image data store 620 at least temporarily. Since it may be desirable to manipulate at least some of the images before being presented for display, as discussed herein, the image processor can process at least some of the images before causing those images to be stored in the content repository 614, for example, to be presented for display to a user or otherwise utilized.

The content provider environment 608 can also include an image analysis component 622, system, or service that is able to analyze images using approaches discussed herein. These can include, for example, images received from third party suppliers, images stored in the content database 614, or images received from a user, among other such options. As mentioned, body shape data or other similar data based on image analysis can be extracted from images in order to perform more accurate image augmentation, and can also be extracted from images to be used for the augmentation, in order to improve the augmentation process by enabling characteristics in received images to be compared against characteristics in other or additional images stored in the content database 614. These images thus can also be stored in the content database 614, or another appropriate data store, at least for augmentation purposes. The resource provider environment 608 also can include at least one image augmentation component 624, system, or service, which can receive data about images from the image analysis component 622 and attempt to receive data stored in the content database 614, whereby the results of the augmentation can be passed to the content server 612 for transmission to the requesting computing device 602.

According to an embodiment, the techniques described herein may be performed solely or partially on a client computing device 602, without utilizing the resource provider environment 600 for some or all portions of the techniques described herein. For example, a client computing device 602 may perform various aspects of the techniques described herein without at least some portions of data leaving the client computing device 602, thereby ensuring privacy of data such as the body shape data described herein. As an example, a user may take a photograph with their cellphone of them wearing the special article of clothing. An analysis may be made between the photograph and data representing the special article of clothing in an unworn state, as described herein. Data representing the special article of clothing in an unworn state may for example be downloaded from a remote location (e.g., resource provider environment 600) without any personally-identifying data leaving the user's cellphone, or a photograph of the special article of clothing in an unworn state may be taken by the user and then used in an analysis such that no data leaves the user's computing device. In an embodiment, a user applies a fitting grid to an article of clothing, takes an image of the article of clothing containing the user-applied grid in an unworn state, puts the article of clothing containing the user-applied grid on, and then takes another image, after which the two images are compared, for example to provide augmentation data as discussed herein.

Once the data associated with the special article of clothing, including data regarding a fitting grid, contour marking, and/or reference marker, among other potential identifiers or markings contemplated by one of ordinary skill in the art, then a user may browse prospective articles of clothing, for example on the same cellphone, or on a device under their control (e.g., a wearable device such as a VR headset), such that data describing their body shape may be shared between the devices without the need to communicate the data to a third party, for example over the Internet. All augmentations of the prospective article(s) of clothing may then be determined on the user's device, with resources only transferred from a third party (e.g., a resource provider environment) on an as-needed basis, such as product images, account information, HTML pages, etc., thereby securing the device and any private body data from unwanted transmission.

Figure 7:
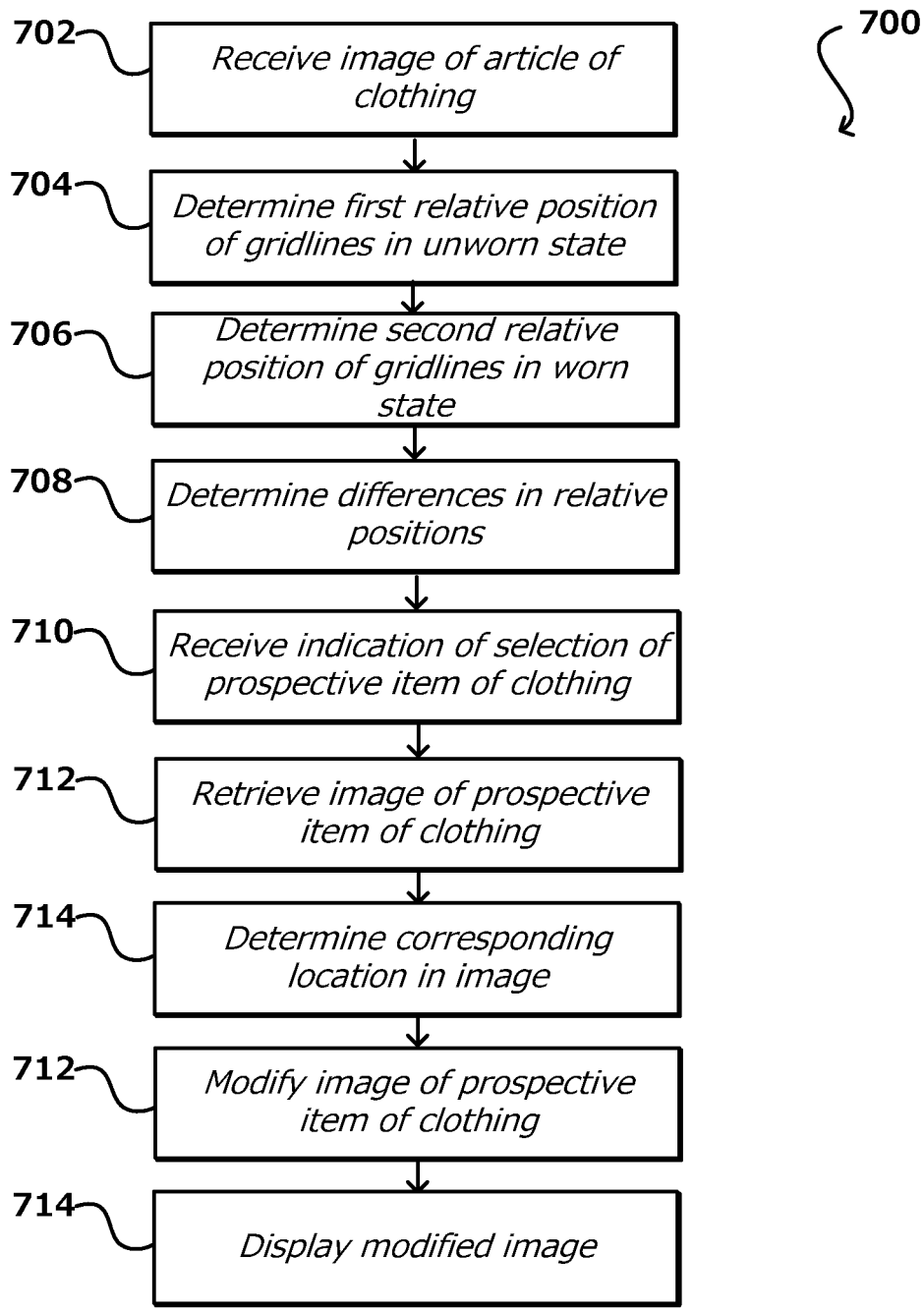
FIG. 7 illustrates an example process for augmented reality fitting, in accordance with various embodiments.

FIG. 7 illustrates an example process 700 for augmented reality fitting that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image is received 702 of a person wearing a special article of clothing, as discussed earlier, for example with regard to FIGS. 1A and 1B. In the image, the article of clothing may be considered to be in a "worn state"; that is, it is being worn by a person in the image. As discussed earlier, one way the image may be captured is by the person putting on the special article of clothing, standing in front of a mirror, and taking a "selfie," for example with their cellphone. An image of the person wearing the special article of clothing may also be taken by another person.

As discussed earlier, the special article of clothing may have various characteristics according to various embodiments. A contour marking may be present on the special article of clothing, for example a dark or black coloring defining all or part of the outline of the special article of clothing. For example, a dress implementation of the special article of clothing may have a contour marking representing an outline of the dress around areas of the dress that, when the dress is viewed from an angle in a flat, 2-dimensional-type view, represent the boundary around the periphery of the dress. The contour marking may be dependent on the view of the special article of clothing. For example, a contour marking for a dress special article of clothing viewed from the side will be in a different location on the dress than a contour marking meant to be viewed head-on, as in a picture from the front. In some embodiments, there may be multiple contour lines for different views. For example, one contour line may represent the outline of a dress special article of clothing when viewed from the front (or back), while another contour line on the dress special article of clothing may be intended to represent the outline when viewed from the side. In some embodiments with multiple contour lines, each contour line representing an outline from a different view perspective may be differentiated in some way; for example, with different colors or patterns, such that automated image analysis or interactive selection may discern which contour line to use in a given situation. Contour lines may also be printed on the special article of clothing in different type of ink or other substance. For example, a contour line may be created using dye, ink, or other substance that appears invisible to the naked eye, but appears when viewed in an image, for example when using special image processing, or a special camera setting, for example to detect UV ink or dye. This technique may also be used to differentiate between multiple contour lines.

In an embodiment, a contour marking defines a shape, for example by determining various points along the contour marking and matching those points to points defining a prospective article of clothing, for example. The contour marking may be thought of as a continuous shape descriptor or as a discrete number of points along a periphery of an article of clothing, which when matched or otherwise compared to points along a periphery of prospective article of clothing, may allow the outer boundary or inner area to be reliably determined.

According to an embodiment, the special article of clothing may also have a fitting grid covering (i.e., imprinted on or otherwise appearing on the clothing surface) the special article of clothing. In an example, the fitting grid may comprise a grid of intersecting (or non-intersecting) gridlines running substantially horizontally and/or vertically on the clothing surface. The grid may be substantially symmetrical; for example, when the special article of clothing is in the unworn state (e.g., lying flat on a table or hanging straight down), the gridlines may appear to be evenly spaced and straight, although other embodiments envision fewer gridlines, possibly running only in one direction. In an embodiment, the fitting grid (i.e., the gridlines) may be temporary (i.e., not imprinted or otherwise always-appearing) on a regular article of clothing; rather, the regular item of clothing may be turned into an ostensible special article of clothing by creating a fitting grid on its surface; for example, by applying tape or thread to the garment. In this example, the garment may have an image captured of the fitting grid when in an unworn and worn state, and then return to being a normal garment by removing the temporary fitting grid.

A first relative position of at least one of the horizontal gridlines and at least one of the vertical gridlines is determined 704 on the special article of clothing in an unworn state. For example, at a particular location on the special article of clothing, a position of a horizontal and a vertical gridline relative to each other is determined. While this may be at an intersection point, that is not required. In an embodiment, such as wherein the special article of clothing has a complete grid of intersecting horizontal and vertical gridlines on at least one surface (as in FIGS. 1A-1B, for example), there may be multiple locations at which a position of a horizontal and a vertical gridline relative to each other is determined; for example, at every intersection point. In some embodiments, there may only be vertical or horizontal gridlines, and a location of at least two of these relative to each other may be determined. Data indicating the relative position and/or relationship of the particular gridlines may be stored; for example, coordinate data may be used, or data reflecting absolute or relative distances.

This determination is made when the special article of clothing is in an "unworn" state; i.e., while the special article of clothing is not being worn by a person. For example, the data corresponding to the first relative position(s) of the gridlines may be determined in a controlled environment while the special article of clothing is lying flat (e.g., the fitting grid is not distorted) or hanging. This data may be determined in advance and stored, for example in a resource provider environment like the example of FIG. 6. In the situation where a special article of clothing is provided to a person so they may wear the special article of clothing and take the "selfie," as described more fully herein, then the "default" data relating to the first relative position(s) of the special article of clothing is determined and stored prior to providing the special article of clothing; therefore, once the second relative position is determined, as described later, the "default" data is already existing and utilized in the augmentation process.

A second relative position is determined 706 in the example embodiment of FIG. 7, wherein the second relative position is of at least one of the horizontal gridlines and at least one of the vertical gridlines on the special article of clothing in an worn state; i.e., while the special article of clothing is being worn by the person. The first and second relative positions correspond to approximately the same location of the special article of clothing. For example, a relative position of a vertical and horizontal guideline (or, as discussed herein, two vertical guidelines or two horizontal guidelines) at a location A on the special article of clothing in the unworn state (e.g., at coordinates {X,Y}, or a particular distance from a point along the contour marking, or a certain number of gridlines from an "anchor" gridlines, an intersection of gridlines X number of intersection above and Y number of intersections to the right of a particular gridlines intersection, etc.) will be compared to the relative position of a vertical and horizontal guideline (or, as discussed herein, two vertical guidelines or two horizontal guidelines) at a substantially similar location A on the special article of clothing in the worn state. For example, a particular intersection point of gridlines on the special article of clothing is the location at which the first relative position is determined, while the special article of clothing is in the "unworn" state. That same intersection point, or an intersection point within a threshold distance (e.g., number of intersection points, etc.) is located on the special article of clothing in the "worn" state, and the second relative position is determined.

A difference in the first and second relative positions is determined 708, for example by analyzing the image (e.g., the "selfie," etc.) to locate the common location at which the first relative position was determined, and determine the second relative position. A comparison (e.g., a difference, distance, etc., such as between relative positions of gridlines on the same special article of clothing, in a substantially similar location, in a worn and unworn state) is made between the first and second relative positions. In various embodiments, the comparison of the first and second relative positions is used to generate data describing the relationship between the special article of clothing as it appears in the unworn as compared to the worn state. This data may comprise "body shape data" or a "body matrix" of the person wearing the special article of clothing; for example, by comparing the relative position of the gridlines at corresponding locations on the special article of clothing in the worn versus the unworn state, it may be determined how the changes in the relative positions describe how a garment looks "on" the person. This "look" may be described in a mathematical table or matrix and stored, for example as a metric, and used to augment (e.g. modify) an image of a prospective article of clothing so that it may be displayed as it might look when worn by a person of the same or similar body shape as the person wearing the special article of clothing, as described further herein.

An indication of a selection of a prospective article of clothing is received 710; for example, a user (e.g., the same person in the image wearing the special article of clothing) may be shopping on an e-commerce website and select a particular dress, the image of which may be augmented according to the techniques described herein. The prospective article of clothing may be returned along with other articles of clothing in response to a search query, for example, and be selected by a user. Once the prospective article of clothing is selected (i.e., the indication of the selection is received), then an image associated with the prospective article of clothing is retrieved 712, for example from an image store as described in FIG. 6. This image may be the same or a different image than an image presented in response to a query that may be selected to provide the indication described above. In an embodiment, the retrieved image is indicated as "capable of modification," which can mean that the particular image may be augmented pursuant to the example techniques described herein. Some images may not be capable of augmentation; for example, the image may lack sufficient resolution or other characteristic.

According to various embodiments, the body shape data, or similar data as described above, may be associated with a unique customer identifier; e.g., a username or e-mail address registered at an e-commerce shopping site. An indication that the particular user has selected a number of prospective articles of clothing may be received, such as examples described earlier with regard to a "fitting queue" of prospective articles of clothing. Not all of the images representing selected prospective articles of clothing may be capable of augmentation, so a determination is made regarding which of the prospective articles of clothing are associated with images capable of modification (i.e., augmentation) and which are associated with non-modifiable images. The images that are capable of modification may be augmented and displayed alongside the non-modifiable images in an arrangement. Images may be non-modifiable for any number of reasons; for example, insufficient number of pixels, cropping issues, unknown dimensions, or if the material comprising the article of clothing in the image is unknown or incorrect, etc.

A location (or locations) in the image of the prospective article of clothing is determined 714, wherein the location corresponds to the location of the special article of clothing where the difference in the relative positions is determined, as described above. For example, the location of the special article of clothing may be at a particular gridline intersection, or distance from a point on the special article of clothing (e.g., X millimeters/inches/pixels/etc.), and the substantially identical location on the prospective article of clothing is determined. At this location, the image of the prospective article of clothing is modified in accordance with the difference in the relative positions described above (or the body shape data, the body matrix, etc.), for example to make the prospective article of clothing appear to be worn by a person with the same body shape as the person in the image of the special article of clothing, taking into consideration factors such as fabric composition, quality, "stretchiness," etc., as described further herein. For example, a prospective article of clothing made of spandex will appear different in the augmentation process at various locations where the body data indicates a "stretching" or "sagging" than a thick cotton yarn, for example, due to the stretching/sagging/folding/wrinkling characteristics of the article of clothing (e.g., a stretch threshold corresponding to an amount the type of material is capable of stretching), etc.

Once the image of the prospective article of clothing is modified (e.g., at one or multiple locations), then the modified image of the prospective article of clothing is displayed 714 along with (e.g., layered on, etc.) the image of the person wearing the special article of clothing (the "person image"). For example, the modified image of the prospective article of clothing may be layered on top of the person image, or portions of the person image may be removed or otherwise modified in order to fit the modified image of the prospective article of clothing into the person image. According to various embodiments, the modified image is positioned for display according to the contour marking in the person image; for example, the contour marking may describe a boundary or area that is filled with the modified image (e.g., a replacement area), such that the contour marking is no longer visible, either being covered or removed, for example. Data represented by a reference marking on the special article of clothing (e.g., dimension data, type of clothing, etc.), as described herein, may also be utilized to position the modified image of the prospective article of clothing for display, in addition to serving as an "anchor" as described herein. For example, a different size of dress (e.g., S, M, L), in a particular type of cut (e.g., mini-dress, etc.), a hemline length, etc., may describe characteristics of a fitting grid in order to aid with the positioning process. For example, spacing between lines of a fitting grid may change depending on the size of the dress, the material of the dress, the cut of the dress, etc. By determining this type of information, the techniques may anticipate aspects of the contour marking, such as positioning, which aids in the positioning of the modified image. Data such as knowing the special article of clothing is a short-sleeve shirt, size medium, 100% cotton, etc., may indicate an expected fitting grid of fifty total gridlines each spaced one inch apart and extending 36 inches downward, etc.

According to an embodiment, a size of the prospective article of clothing may be selected, along with determining a type of material comprising the prospective article of clothing. There may be a "stretch threshold" associated with the type of material and/or the prospective article of clothing, which in various embodiments corresponds to an amount of stretch the type of material is capable of undergoing before the stretching adversely affects the prospective article of clothing. If it is determined that, based on the difference in the first and second relative positions, the prospective article of clothing would have to stretch to a degree that would exceed the stretch threshold, a recommendation of a particular size (e.g., larger) may be provided.

Figure 8:
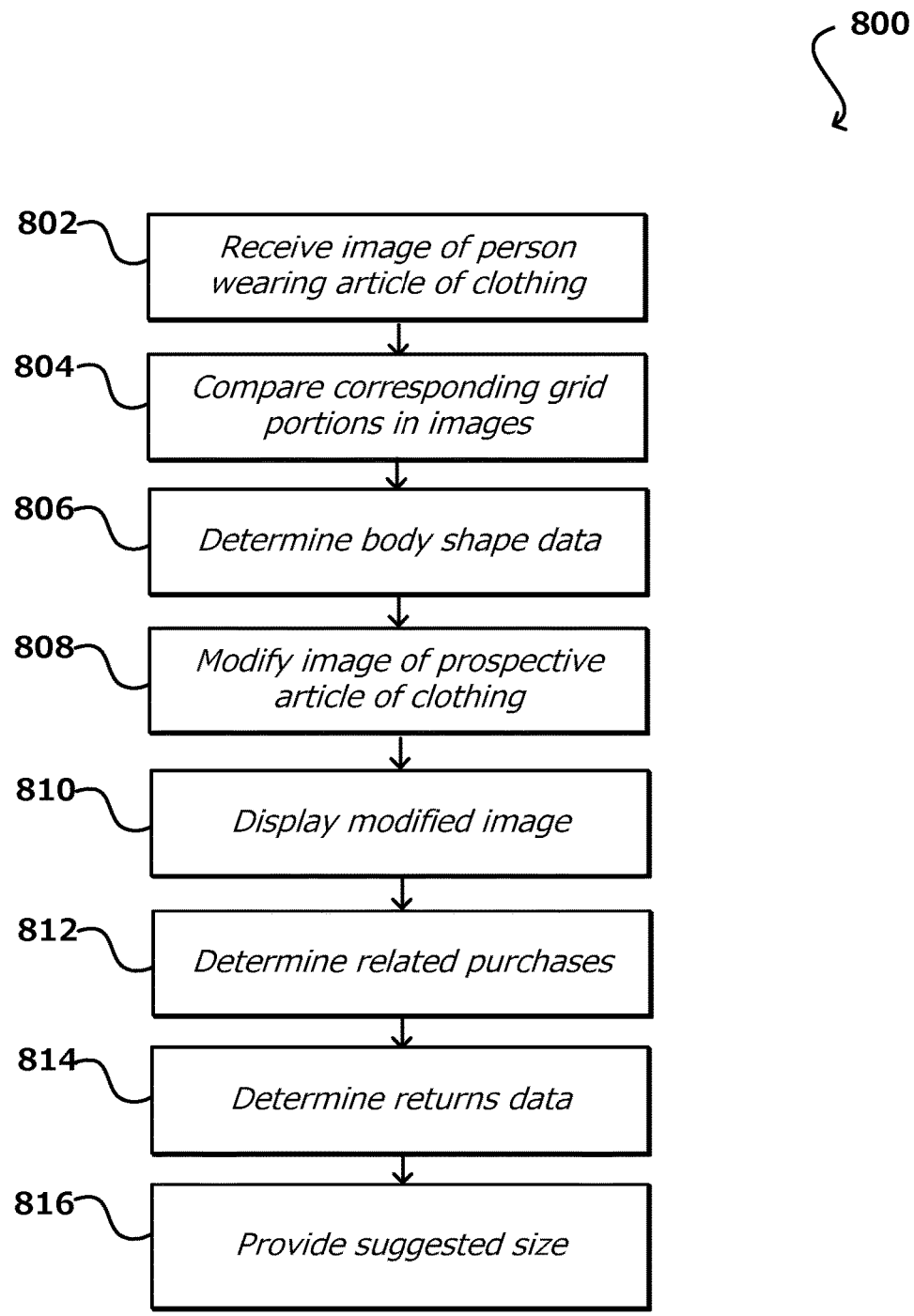
FIG. 8 illustrates an example process for augmented reality fitting, in accordance with various embodiments.

FIG. 8 illustrates an example process 800 for augmented reality fitting that can be utilized in accordance with various embodiments. An image of a person wearing an article of clothing (a "special article of clothing") is received 802 (or retrieved). The special article of clothing has, in various embodiments, a contour marking and a grid of intersecting horizontal and vertical lines, as described herein. At least a portion of the grid represented in the received image (e.g., in a "worn state") is compared 804 with a corresponding portion of the grid as represented in one or more images of the special article of clothing without a wearer (e.g., in an "unworn state").

Body shape data is determined 806 for the person, for example based on the comparing of the corresponding portions of the grid on the special article of clothing. This body shape data, as described herein, may comprise a mathematical matrix describing differences in corresponding portions of the grid on the special article of clothing in the worn versus the unworn state. Based at least on the body shape data, at least a portion of an image of a prospective article of clothing is modified 808, for example to make the image of the prospective article of clothing look as if it is being worn by the person represented in the body shape data. As opposed to a mere outline of a person, such as may be created by tracing an outline of a person represented in an image and placing an image of clothing on the outline, the body shape data indicates how a garment shifts, stretches, and moves on various points of a person's body, and the body shape data is used to recreate these properties in the prospective article of clothing, at substantially similar positions on the prospective article of clothing.

The modified image is then displayed 810 in combination with the image of the person using the contour marking; for example, the modified image is layered on top of or otherwise combined with the image of the person so that it appears that the person is wearing the prospective article of clothing, as modified by the body shape data and as described further herein. For example, a picture of the person is layered with the modified image. A set of purchases of the prospective article of clothing is determined 812; for example, over a particular time frame, it is determined that the prospective article of clothing was purchased X number of times. Of the X number of purchases, it is determined that a set of them were made by individuals having substantially similar body shape data (e.g., within a threshold difference) to the person in the image from step 802. Once the set of purchases is determined, for each size of the prospective article of clothing that is offered for sale (e.g., S, M, L, 12, 14, 15/33, etc.), it is determined 814 how many (e.g., a rate) of the purchases were returned and replaced with a different size. For example, if the prospective article of clothing was purchased 10 times by other people having a similar body shape to the person, with 8 of those purchases being size medium and 2 being size large, and none of the 8 medium purchases were returned while both of the 2 large purchases were returned, then "medium" would be associated with a zero rate of return and "large" would be associated with a 100% rate of return (although raw numbers or other measurements may be used in place of rates or percentages). Based on the return data, a suggested size of the prospective article of clothing is provided 816 to the person to aid in their potential ordering. In this example, a size "medium" would be suggested because 0% of the prospective article of clothing in size medium ordered by people having a substantially similar body shape (e.g., per the body shape data) were returned, for example for a different size, although other metrics may be used to provide purchasing recommendations (e.g., manufacturer, supplier, color, fabric composition, etc.).

According to an embodiment, dimension data associated with a prospective article of clothing is determined, along with a stretching quality associated with material comprising the prospective article of clothing. A determination may be made, based on various data such as the dimension data, the stretching quality, the body shape data, etc., that the prospective article of clothing in the selected size will not fit the person, and providing an indication of the ill fit in response.

Figure 9:
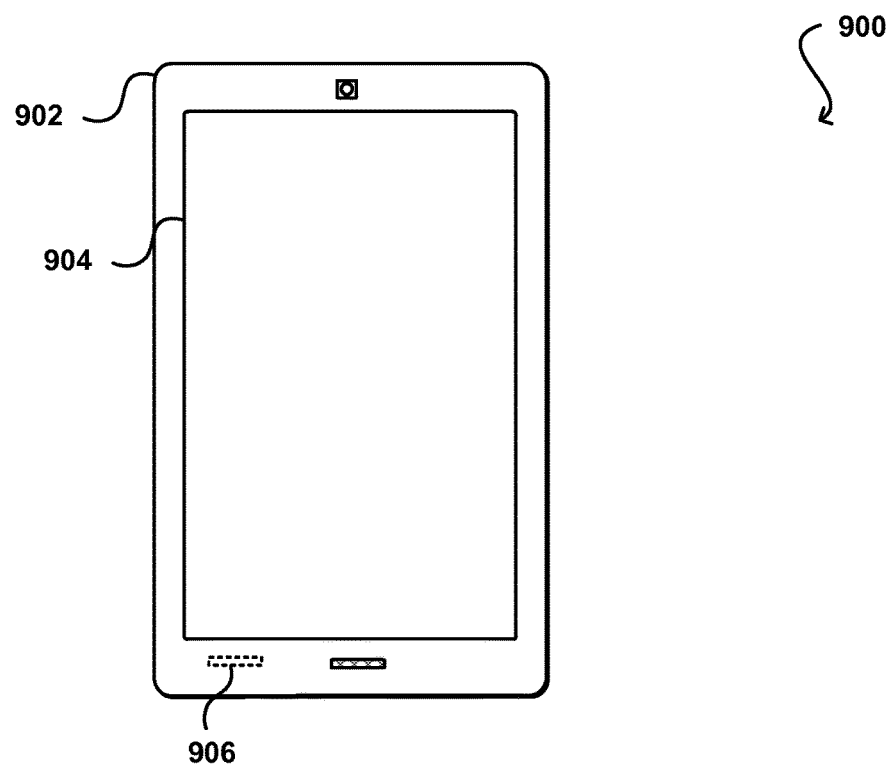
FIG. 9 illustrates an example computing device that can be utilized in accordance with various embodiments.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 10:
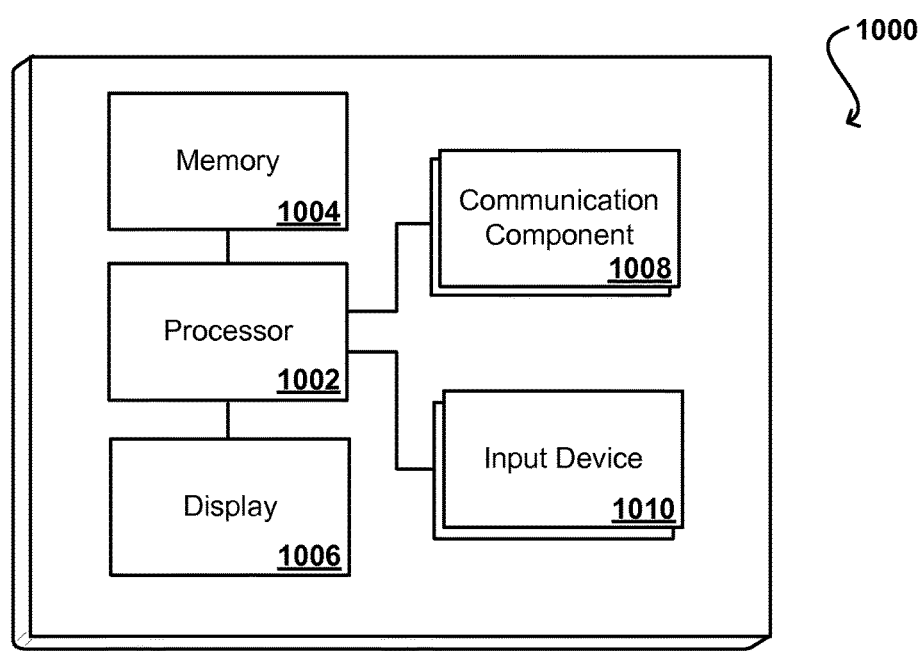
FIG. 10 illustrates an example configuration of components of a computing device, such as the device illustrated in FIG. 9.

In this example, the computing device 900 has a display screen 904 and an outer casing 902. The display screen under normal operation will display information to a user (or viewer) facing the display screen (e.g., on the same side of the computing device as the display screen). As discussed herein, the device can include one or more communication components 906, such as may include a cellular communications subsystem, Wi-Fi communications subsystem, BLUETOOTH® communication subsystem, and the like. FIG. 10 illustrates a set of basic components of a computing device 1000 such as the device 900 described with respect to FIG. 9. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers. The device can include at least one communication component 1008, as may enabled wired and/or wireless communication of voice and/or data signals, for example, over a network such as the Internet, a cellular network, a Wi-Fi network, BLUETOOTH®, and the like. The device can include at least one additional input device 1010 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
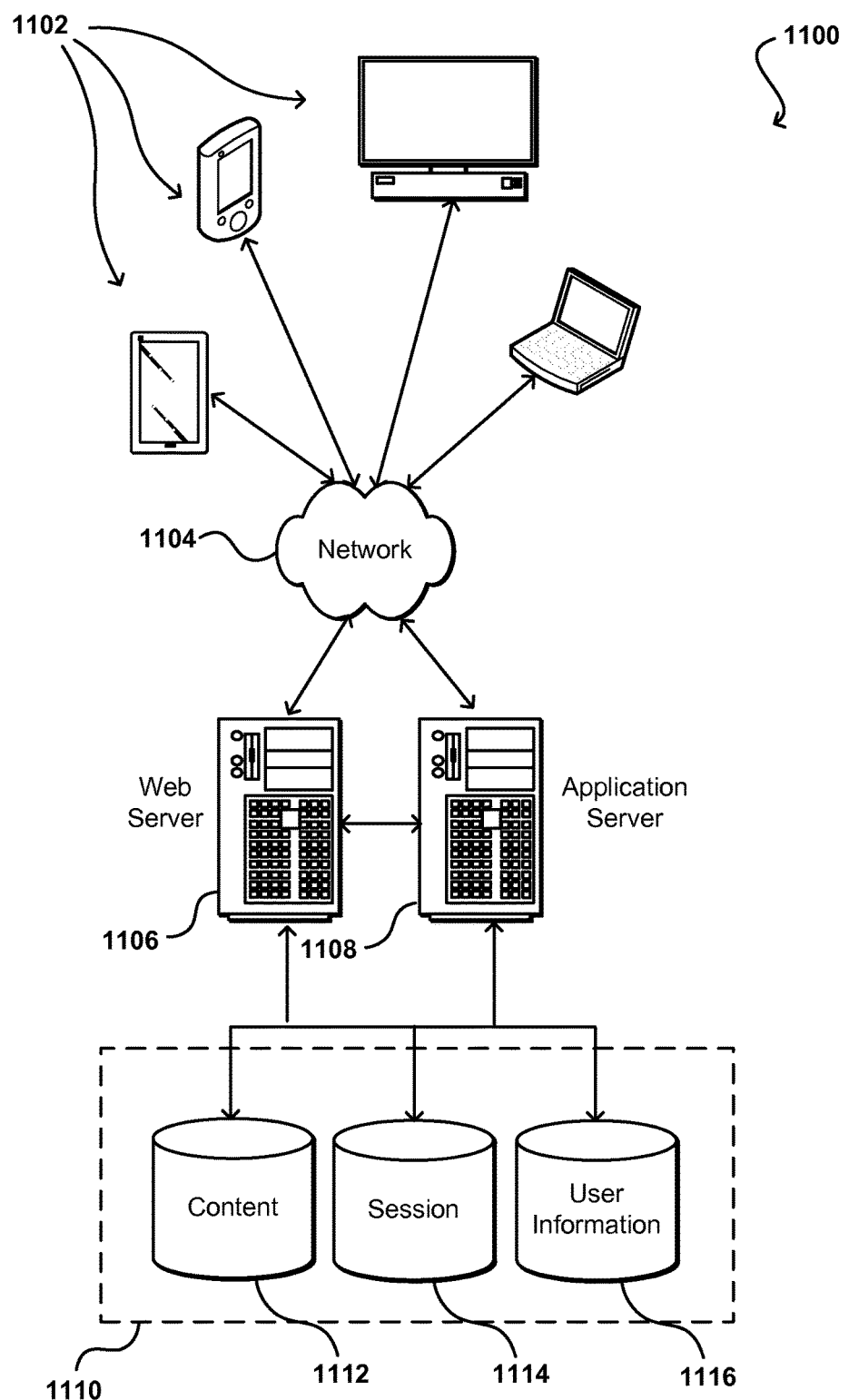
FIG. 11 illustrates an example environment in which aspects of the various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a computing device, an image of a person wearing an article of clothing, the article of clothing being in a worn state and having a contour marking representing an outline of the article of clothing, the article of clothing further having a fitting grid comprising a substantially symmetrical grid of a plurality of horizontal gridlines and vertical gridlines;
determining a first relative position of at least one of the plurality of horizontal gridlines and at least one of the plurality of vertical gridlines of the article of clothing in an unworn state;
determining a second relative position of at least one of the plurality of horizontal gridlines and at least one of the plurality of vertical gridlines of the article of clothing in the worn state, the first relative position and the second relative position corresponding to approximately the same location of the article of clothing;
analyzing the image to determine a difference in the first relative position and the second relative position;
receiving an indication of a selection of a prospective article of clothing;
retrieving an image of the prospective article of clothing, the image indicated as capable of modification;
determining a location in the image of the prospective article of clothing corresponding to the first relative position and the second relative position of the article of clothing;
causing, at the location, a modification of the image of the prospective article of clothing, the modification of the image representing the difference in the first relative position and the second relative position and resulting in a modified image of the prospective article of clothing;
causing the modified image of the prospective article of clothing to be displayed along with the image of the person, the modified image of the prospective article of clothing being positioned for display according to the contour marking to appear worn by the person;
storing data representing the difference in the first relative position and the second relative position; and
associating the data with a unique identifier.

2. The computer implemented method of claim 1, further comprising:
determining a selected size of the prospective article of clothing;
determining a type of material comprising the prospective article of clothing, the type of material associated with a stretch threshold corresponding to an amount the type of material is capable of stretching;
determining that the difference in the first relative position and the second relative position would result in the prospective article of clothing exceeding the stretch threshold; and
providing a recommended size of the prospective article of clothing.

3. The computer implemented method of claim 1, further comprising:
identifying, in the image of the person wearing the article of clothing, a reference marker on the article of clothing;
determining, from the reference marker, dimension data and a type of clothing associated with the article of clothing; and
using the dimension data and the type of clothing to position the modified image of the prospective article of clothing for display.

4. The computer implemented method of claim 1, further comprising:
receiving an indication that the person is associated with the unique customer identifier and has selected a plurality of prospective articles of clothing;
determining that a subset of the plurality of prospective articles of clothing are associated with images indicated as capable of modification and the remaining prospective articles of clothing are associated with non-modifiable images;
causing a modification of the images indicated as capable of modification, resulting in a plurality of modified images associated with the prospective articles of clothing;
causing the plurality of modified images associated with the prospective articles of clothing to be displayed along with the image of the person, the modified image of the prospective article of clothing being positioned for display according to the contour marking to appear worn by the person; and
causing the non-modifiable images to be displayed.

5. A computer implemented method, comprising:
receiving a received image containing a representation of an article of clothing being worn by a person, the article of clothing having a contour marking representing an outline of the article of clothing and a grid of intersecting horizontal and vertical lines;
comparing at least a portion of the grid represented in the received image with at least a corresponding portion of the grid represented in one or more images of the article of clothing when not worn by a person;
determining, based on the comparing of the at least a portion of the grid, body shape data associated with the person;
causing a modification of an image of a prospective article of clothing based at least on the body shape data, resulting in a modified image of the prospective article of clothing;
causing the modified image of the prospective article of clothing to be displayed in combination with the received image, the modified image of the prospective article of clothing being positioned on the received image based at least on the contour marking;
determining a set of purchases of the prospective article of clothing, the set of purchases made by customers associated with substantially similar body shape data to the person;
determining, for each size of the prospective article of clothing available for purchase, a rate at which each size of the set of purchases was returned for a different size; and
providing a suggested size of the prospective article of clothing for purchase by the person, based at least upon the rate or the different size.

6. The computer implemented method of claim 5, wherein causing a modification of the image of the prospective article of clothing further comprises:
determining dimension data associated with the prospective article of clothing;
determining a stretching quality associated with material comprising the prospective article of clothing;
determining, based on the dimension data, the stretching quality, and the body shape data that the prospective article of clothing will not fit the person; and providing an indication that that the prospective article of clothing will not fit the person.

7. The computer implemented method of claim 5, wherein causing the modified image of the prospective article of clothing to be displayed on the received image further comprises:
   determining, in the received image, a replacement area enclosed by the contour marking;
   analyzing the image of the prospective article of clothing to determine an outline of the prospective article of clothing;
   determining corresponding portions of the outline of the article of clothing and the outline of the prospective article of clothing; and
   aligning the corresponding portions such that the replacement area is substantially filled with the image of the prospective article of clothing.

8. The computer implemented method of claim 5, further comprising:
   receiving a search query;
   providing, in response to the search query, at least a plurality of images, each image of the plurality of images containing a representation of a relevant article of clothing;
   identifying at least one non-modifiable image of the plurality of images, the at least one non-modifiable image incapable of being modified based at least on the body shape data; and
   causing the at least one non-modifiable image to be displayed with the plurality of images, at least one non-modifiable image containing a representation of the relevant article of clothing being worn by a model.

9. The computer implemented method of claim 5, wherein positioning the prospective article of clothing on the received image further comprises:
   receiving an indication that the prospective article of clothing is not positioned correctly on the received image;
   receiving an indication comprising coordinates of a new position of the display of the prospective article of clothing; and
   causing the modified image to be positioned on the received image according to the coordinates of the new position.

10. The computer implemented method of claim 5, further comprising:
    identifying, in the received image, a reference marker on the article of clothing;
    determining, from the reference marker, dimension data and a type of clothing associated with the article of clothing; and
    using the dimension data and the type of clothing to position the modified image of the prospective article of clothing for display.

11. The computer implemented method of claim 5, further comprising:
    receiving an indication of a selection of a plurality of prospective articles of clothing;
    receiving an indication requesting an augmentation of a first prospective article of clothing of the plurality of prospective articles of clothing;
    causing a modification of an image of the first prospective article of clothing based at least on the body shape data, resulting in a first modified image of the first prospective article of clothing
    causing the first modified image of the first prospective article of clothing to be displayed in combination with the received image, the first modified image of the first prospective article of clothing being positioned on the received image based at least on the contour marking; and
    receiving an indication requesting an augmentation of a second prospective article of clothing of the plurality of prospective articles of clothing.

12. A system, comprising:
    at least one processor;
    memory including instructions that, when executed by the processor, cause the computing system to:
    receive a received image containing a representation of an article of clothing being worn by a person, the article of clothing having a contour marking representing an outline of the article of clothing and a grid of intersecting horizontal and vertical lines;
    compare at least a portion of the grid represented in the received image with at least a corresponding portion of the grid represented in one or more images of the article of clothing when not worn by a person;
    determine, based on the comparing of the at least a portion of the grid, body shape data associated with the person;
    cause a modification of an image of a prospective article of clothing based at least on the body shape data, resulting in a modified image of the prospective article of clothing;
    cause the modified image of the prospective article of clothing to be displayed in combination with the received image, the modified image of the prospective article of clothing being positioned on the received image based at least on the contour marking;
    determine a set of purchases of the prospective article of clothing, the set of purchases made by customers associated with substantially similar body shape data to the person;
    determine, for each size of the prospective article of clothing available for purchase, a rate at which each size of the set of purchases was returned for a different size; and
    provide a suggested size of the prospective article of clothing for purchase by the person, based at least upon the rate or the different size.

13. The system of claim 12, wherein the instructions, when executed, further cause the system to:
    determine dimension data associated with the prospective article of clothing;
    determine a stretching quality associated with material comprising the prospective article of clothing;
    determine, based on the dimension data, the stretching quality, and the body shape data that the prospective article of clothing will not fit the person; and
    provide an indication that that the prospective article of clothing will not fit the person.

14. The system of claim 12, wherein the instructions, when executed, further cause the system to:
    determine, in the received image, a replacement area enclosed by the contour marking;
    analyze the image of the prospective article of clothing to determine an outline of the prospective article of clothing;
    determine corresponding portions of the outline of the article of clothing and the outline of the prospective article of clothing; and
    align the corresponding portions such that the replacement area is substantially filled with the image of the prospective article of clothing.

15. The system of claim 12, wherein the instructions, when executed, further cause the system to:
- receive a search query;
- provide, in response to the search query, at least a plurality of images, each image of the plurality of images containing a representation of a relevant article of clothing;
- identify at least one non-modifiable image of the plurality of images, the at least one non-modifiable image incapable of being modified based at least on the body shape data; and
- cause the at least one non-modifiable image to be displayed with the plurality of images, at least one non-modifiable image containing a representation of the relevant article of clothing being worn by a model.

16. The system of claim 12, wherein the instructions, when executed, further cause the system to:
- receive an indication that the prospective article of clothing is not positioned correctly on the received image;
- receive an indication comprising coordinates of a new position of the display of the prospective article of clothing; and
- cause the modified image to be positioned on the received image according to the coordinates of the new position.

17. The system of claim 12, wherein the instructions, when executed, further cause the system to:
- identify, in the received image, a reference marker on the article of clothing;
- determine, from the reference marker, dimension data and a type of clothing associated with the article of clothing; and
- use the dimension data and the type of clothing to position the modified image of the prospective article of clothing for display.

18. The system of claim 12, wherein the instructions, when executed, further cause the system to:
- receive an indication of a selection of a plurality of prospective articles of clothing;
- receive an indication requesting an augmentation of a first prospective article of clothing of the plurality of prospective articles of clothing;
- cause a modification of an image of the first prospective article of clothing based at least on the body shape data, resulting in a first modified image of the first prospective article of clothing
- cause the first modified image of the first prospective article of clothing to be displayed in combination with the received image, the first modified image of the first prospective article of clothing being positioned on the received image based at least on the contour marking; and
- receive an indication requesting an augmentation of a second prospective article of clothing of the plurality of prospective articles of clothing.

\* \* \* \* \*